March 12, 1946. J. B. GUTHRIE 2,396,369
HARROW HITCH
Filed March 24, 1944 3 Sheets-Sheet 1

INVENTOR.
James B. Guthrie
BY
J. H. Weatherford
Atty.

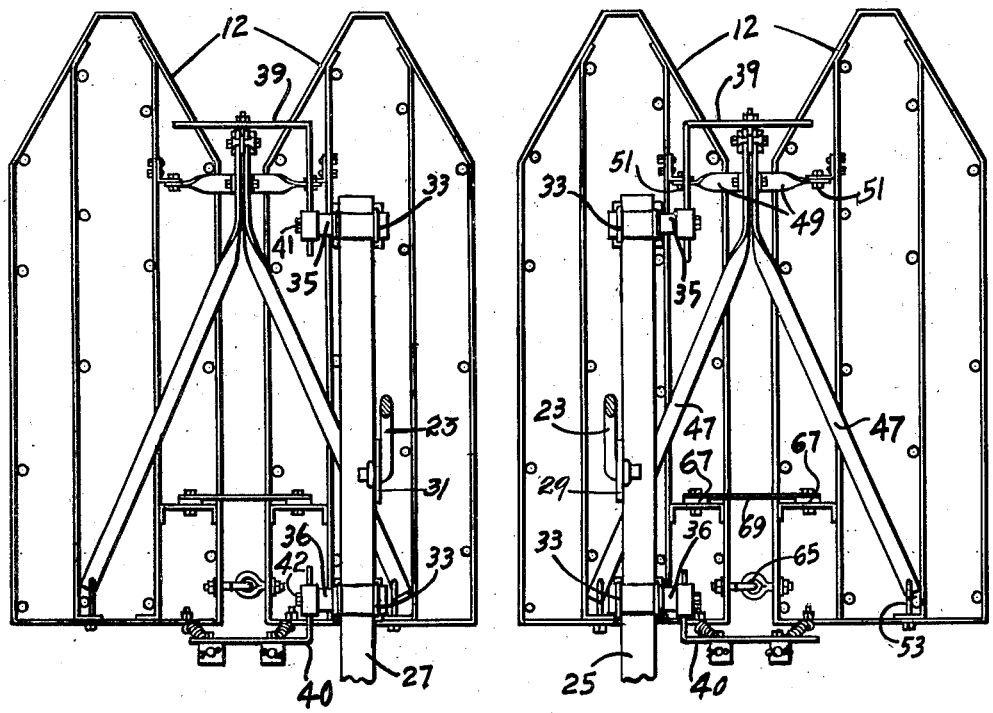
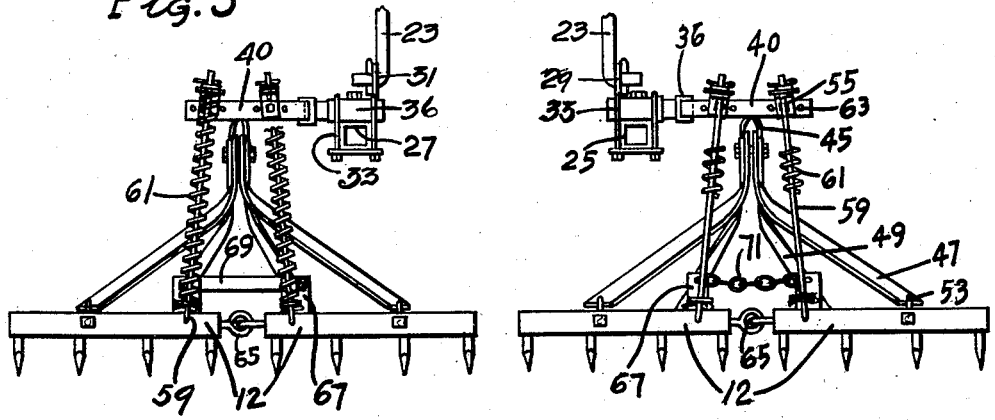

March 12, 1946.   J. B. GUTHRIE   2,396,369
HARROW HITCH
Filed March 24, 1944   3 Sheets-Sheet 3
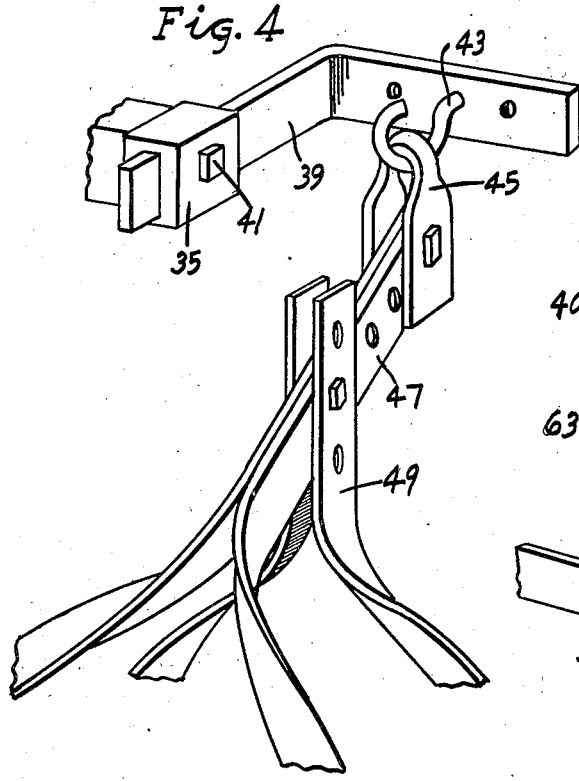
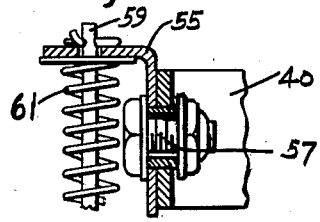
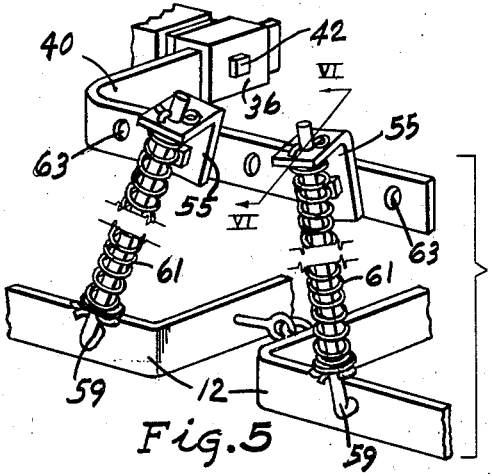
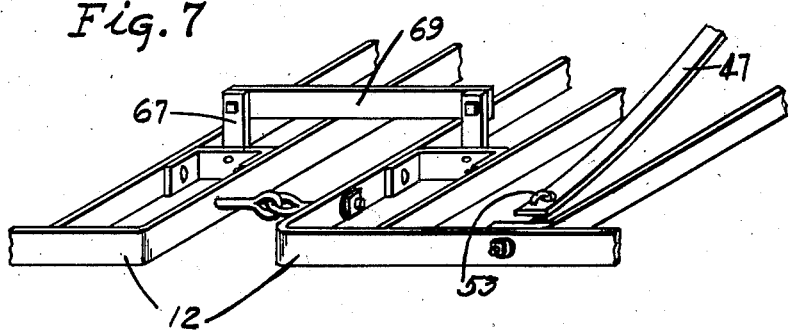
INVENTOR.
James B. Guthrie
BY J.H. Weatherford
Atty Patented Mar. 12, 1946

2,396,369

UNITED STATES PATENT OFFICE 2,396,369

HARROW HITCH

James B. Guthrie, Memphis, Tenn.

Application March 24, 1944, Serial No. 527,917

3 Claims. (Cl. 55—87)

This invention relates to means for effecting the attachment of harrows, such as are shown in my patents, Nos. 1,605,183 and 1,659,262, to tractors, and has particular reference to means which will accomplish the attachment to effect proper traction and support, while providing flexibility of movement which will allow the harrow to conform itself to inequalities in the contour of the underlying earth surfaces and provide additionally for manual control of the harrow.

Tractors now in use for farm purposes are provided with rear hitches to which various types of plows, harrows or cultivating instruments may be attached and drawn therebehind. The driver of the tractor has, however, little or no control of the rear attached instrumentalities, and while they may be adjusted and are extremely efficient in preparing ground for seeding and planting, lack of control greatly reduces their efficiency and often renders them useless for the cultivation of growing crops.

To meet this situation, a number of tractors have been provided with cultivator equipment which may be attached between the front and rear wheels of the tractor on the opposite sides thereof, this equipment including attaching parts and bars supported from the parts by suitable linkage and levers, through which raising and lowering of the bars and cultivator teeth carried thereby may be accomplished by the driver during operation of the tractor.

The objects of the present invention are:

To provide hitch means for suitably supporting harrows from such bars and effecting tractive action on the harrows;

To provide hitch means which will flexibly support the forward and the rear ends of the harrow, while allowing lateral movement to allow the harrows to conform themselves to existing rows which are being cultivated;

To provide as a part of the hitches, supporting attachments for the rear ends of the harrows which will resiliently urge them into conforming contact with the ground surface, yet allow relieving action from contact with unexpected obstacles or ground inequalities; and To provide harrow attachment which will support the forward end of the harrow and transfer the traction pull to the rear end thereof.

The means by which the foregoing and other objects are accomplished, and the method of their accomplishment, will readily be understood from the following specification upon reference to the accompanying drawings, in which:

Fig. 2 is a plan view taken as on the line II—II of Fig. 1, showing the forward ends of the two cultivator bars and the underlying harrows supported therefrom.

Fig. 3 is a rear end elevation, as on the line III—III of Fig. 1.

Fig. 4 is a fragmentary perspective view showing the front hitch to the cultivator bar.

Fig. 5 is a similarly perspective view with an intermediate part of the supporting rods and springs broken away showing the rear support for the harrow; and Fig. 6 is a sectional detail, at VI—VI of Fig. 5, showing the pivotal bracket attachment.

Fig. 7 is a perspective view showing fragmentary portions of the rear ends of the two harrows and a traction link to one thereof.

Figure 1:
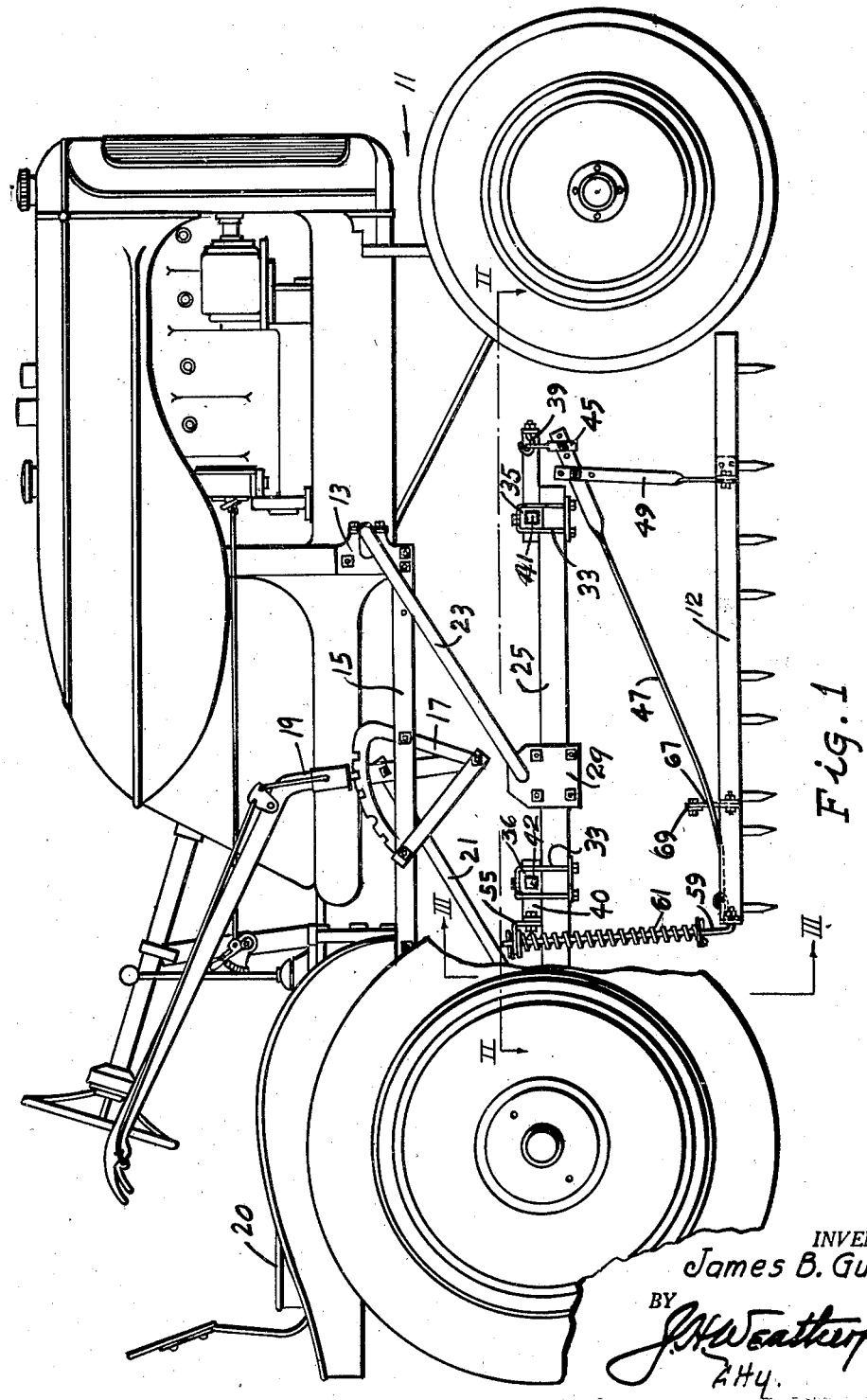
Fig. 1 is a side elevation of a typical farm tractor with the attachable cultivator control bars in place and the harrow supported thereby.

Referring now to the drawings in which the various parts are indicated by numerals:

11 is a typical farm tractor, and 12 the harrows attached to and supported therefrom, each of the two harrows used and shown comprising two halves coupled together.

Attached to the tractor, in usual manner, are supporting parts 13 and 15, the part 15 carrying a quadrant 17 which in turn carries an actuating arm 19 extending into proximity to the driver's seat 20. The arm 19 and part 13 carry links 21, 23, respectively, which support a traction bar 25, this bar being raised, or lowered, and, incidentally, forwardly shifted by actuation of the arm 19. The bar 25 and supporting structure therefor is duplicated on the opposite side of the tractor by a second bar 27, similarly supported, and actuated by the same arm 19. Preferably these bars are of square or rectangular cross section. Clamped, or otherwise rigidly secured to these bars, are upstanding lugs with which the links 21 and 23 engage, only the forward ones 29 and 31 being shown.

Disposed across, and extending laterally outward from, the bars 25 and 27 are bracket supports 35 and 36 which are solidly clamped to the bars as by U bolts 33. The bracket supports 35 and 36 on both sides of the tractor are slotted to receive brackets 39 and 40 respectively, which in turn are clamped to the supports 35 and 36, as by set screws 41 and 42, the socket and bracket supports forming convenient members for attachment of the brackets and other parts of the hitch.

Secured as to the front brackets 39 are hooks 43 engaged respectively by shackles 45 which swingingly support traction links 47. From these traction links, hangers 49 depend to and support the forward ends of the harrows 12, these hangers each comprising downwardly diverging parts which are respectively secured to the two halves of a harrow through pivot connections 51.

The traction links 47 extend downwardly and rearwardly and likewise spread apart and are respectively attached through hooks 53 to the rear ends of the two harrow halves.

55 are angle members which are pivotally secured to the rear brackets 40, as by a bolt and sleeve connection 57, shown in Fig. 6, which permits free swinging movement of the angle members. Supported by these angle members are depending rods 59 which are disposed for upward sliding movement through these members, the rods respectively engaging and supporting the back ends of the halves of the harrows 12.

61 are compression springs which are respectively interposed between the tops of the harrow halves and the underside of the angle brackets 55 to hold down the back end of the harrow. In Fig. 3, a portion only of the springs 61 are shown on some of the rods 59, whereas on others the complete spring is shown.

The halves of the harrow 12 are flexibly connected, as usual, by interlocking eye bolts 65. Extending upward from the harrow halves are short posts 67 which at option may be rigidly connected by transverse bars 59 to maintain the harrow as a rigid flat unit, or by a chain 71 which will permit relative hinge movement, but limit downward movement of the outer sides of the harrow halves, the rigid bar being shown in the left half of Fig. 3, and the chain on the right half as alternate connections.

The brackets 39 and 40 are provided with a number of holes 63 which allow lateral adjustment of the positioning of the various attaching members and corresponding lateral shift of the supporting links and rods. Also the hangers 49 at their upper ends and the traction links 47 at their forward ends are similarly provided with a number of holes, whereby vertical adjustment of the forward end of the harrow may be made relatively to the back end thereof and also forward or backward traction adjustment be made.

It will also be noted that the hitch at the forward end of the traction bars 47 is extremely flexible, the shackles 45 swinging freely with regard to the traction links and with regard to the bracket 39, thus providing in the case of increased traction on the harrow caused as by an obstruction, an upward swinging movement of the front end of the harrow, which is usually sufficient to permit over-riding by the front end of the harrow of the obstruction, and similarly it will be noted that the slidability of the rods 59 through the angle members 55 and the compressibility of the spring 61 allow similar over-riding of the obstacle by the rear end of the tractor.

Further, the provision for lateral adjustment of the front and rear ends of the harrows relatively to the traction bars provides for desirable variation in harrow spacing, and the flexible attachment also provides for such lateral adjusting movements as are necessary to permit the harrows to accommodate themselves to conditions that arise during the ordinary operation of the harrow.

To equip a tractor with the harrows, the sockets 29 and 31 are shifted to proper position along the traction bars 25, the brackets 39, with the front end supports of the harrows carried thereby, and the brackets 40 with the rear end supports of the harrows carried thereby, are secured in the bracket supports 35 and 36 respectively, and secured thereto by the clamping screws 41 and 42. After such securing, adjustment of the shackles 45 relatively to the forward end of the traction links 47, and the similar vertical adjustment of the hangers 49 relatively to the traction links is accomplished to make the harrows ride level, or in such other positions with respect to the horizontal as may be desired, and the equipment is ready for use.

After the tractor is equipped the arm 19 may be shifted to raise the tractor bars 25 and 27 and lift the harrows clear of the ground. The tractor may then be driven into the field and when alined with the rows to be cultivated, the arm 19 operated to lower the harrows into operating position, after which the tractor is driven and guided to accomplish the main alinement of the harrows with the rows.

In this operation, the harrows may be released to entirely rest on the ground surface and cut as deep as the condition of the ground permits, or they may be supported to limit the depth, this being done, as before, by actuation of the bar 19. Should the ground be excessively hard, the back end of the harrow may be forced down and additional compression be put on the spring 61 to cause deeper cutting. Also, though not shown, the front end of the harrow may be weighted, in usual manner.

In turning at the end of the rows, or should obstacles show up, the harrow may be raised, and also it may be raised when use thereof is completed and it is desired to move to another field.

It is particularly to be noted that at all times the action of the harrows and their control is under the full observation of the operator.

I claim:

1. The combination with a tractor having front and rear wheels spaced apart, traction bars carried by said tractor on opposite sides thereof, and means for raising and lowering said bars; of a pair of harrows disposed below said bars, and supporting hitch means therefor; each said hitch means comprising front and rear brackets rigidly secured to and extending laterally outward from its related said traction bar, flexible linkage depending from said front bracket, traction links secured thereto at their forward ends by said linkage and extending downwardly and rearwardly to attachment with the rear end of the related said harrow, hangers swingingly supported by said links adjacent said flexible linkage, diverging downwardly and pivotally connected to said harrow; and supporting means for the rear end of said harrow comprising a pair of laterally spaced rods, slidably supported at their upper ends for upward movement by said rear bracket, extending downwardly and pivotally connected to said harrow, and compression springs carried respectively by said rods and interposed between the under side of said bracket and the upper side of said harrow.

2. The combination with a tractor having front and rear wheels spaced apart, traction bars carried by said tractor on opposite sides thereof, and means for raising and lowering said bars; of a pair of harrows disposed below said bars, and supporting hitch means therefor, each said hitch means comprising a front and a rear bracket, each rigidly secured to and extending laterally outward from its related said traction bar, linkage flexibly secured to said front bracket extending downwardly and rearwardly and attached to the rear end of said harrows, and linkage extending downwardly and outwardly and pivotally connected to said harrow; and supporting means for the rear end of said harrow comprising a pair of laterally spaced rods, swingingly and slidably supported at their upper ends by said rear bracket, extending downwardly and pivotally connected to said harrow, and compression springs carried respectively by said rods and interposed between the under side of said bracket and the upper side of said harrow.

3. The combination with a tractor having front and rear wheels spaced apart, traction bars carried by said tractor on opposite sides thereof, and means for raising and lowering said bars; of a pair of harrows disposed below said bars, and supporting hitch means therefor; each said hitch means comprising a front and a rear bracket, supporting means connecting the first said bracket to the forward end of and underlying said harrow, traction means flexibly connecting the front said bracket to the rear end of said harrow, and supporting means for the rear end of said harrow comprising a pair of laterally spaced rods swingingly and slidably supported at their upper ends by said rear bracket, extending downwardly and pivotally connected to said harrow, and compression springs carried respectively by said rods and interposed between the under side of said bracket and the upper side of said harrow.

JAMES B. $\underset{\text{mark}}{\overset{\text{his}}{\times}}$ GUTHRIE.

Witness to mark:
M. RUSSELL.